May 31, 1927. 1,630,681
J. H. WACHTER
PATTERN FOR PRODUCING LACEWORK
Filed Nov. 12, 1924 2 Sheets-Sheet 1
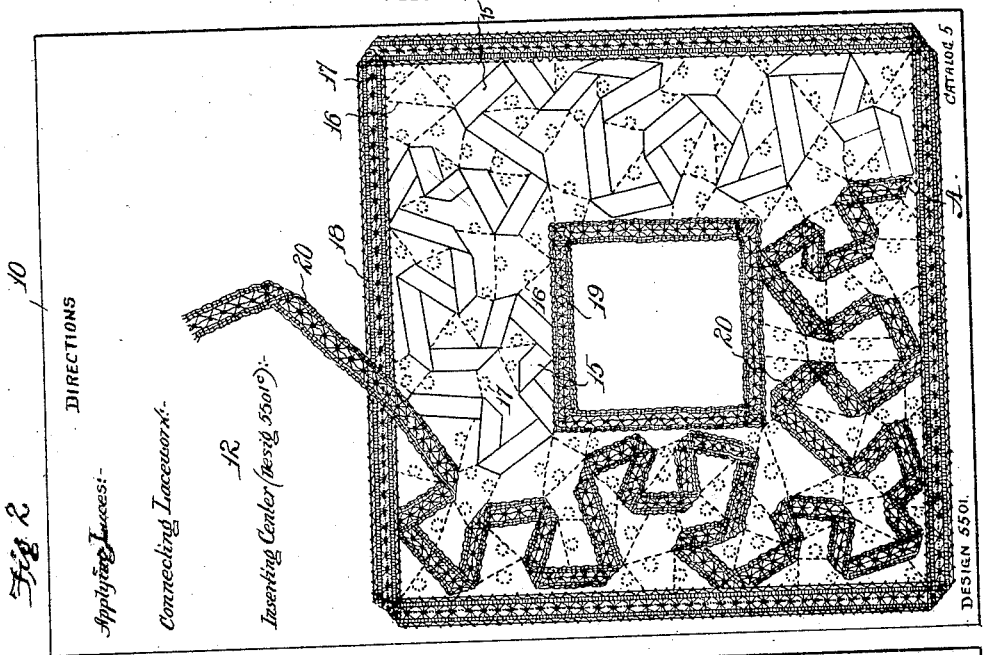
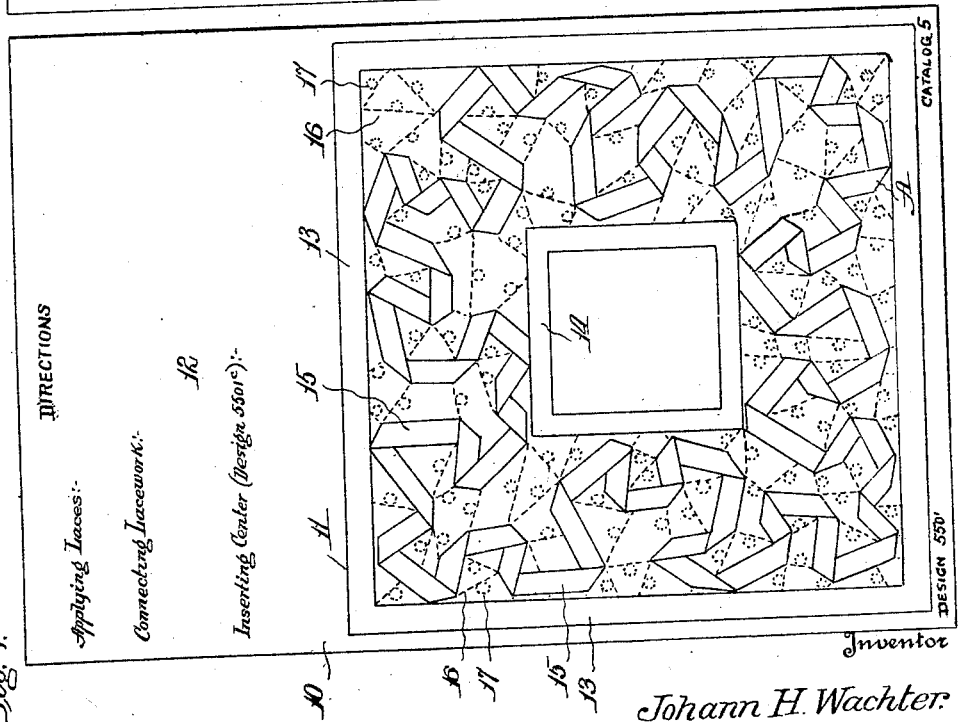
Inventor
Johann H. Wachter.

May 31, 1927.  
J. H. WACHTER  
1,630,681  
PATTERN FOR PRODUCING LACEWORK  
Filed Nov. 12, 1924  
2 Sheets-Sheet 2

Inventor:  
Johann H. Wachter  
By  
Attorneys.

Patented May 31, 1927.

1,630,681

UNITED STATES PATENT OFFICE.

JOHANN H. WACHTER, OF NEW YORK, N. Y.

PATTERN FOR PRODUCING LACEWORK.

Application filed November 12, 1924. Serial No. 749,555.

My invention contemplates a novel means which will promote and facilitate the operation of making artistic, antique and historical laces in the production of various articles, as curtains, spreads, tapestry-work, insertions for wearing apparel, art-squares, doilies, &c.; whereby an article having a particular fanciful design may be produced by handwork in a manner to not only expedite the work but more especially to produce the artistic and antique effect of historical laces; in the present instance providing the means by which anyone who is handy with a needle can readily make articles of the kind hereinabove mentioned and experience considerable pleasure in the accomplishment.

With these objects in view my invention consists primarily in providing a pattern printed on a sheet of paper, said pattern following out a design in a particular manner to make the article desired and more especially to produce an antique effect, the sheet of paper in addition to the pattern containing directions or instructions to be followed in carrying out the work and the design varied for different articles, for instance any one desiring a lace insertion for a garment or gown would select an appropriate pattern, and as the range of patterns both as to designs and uses is manifold I propose to issue books illustrating different designs and from which selection of patterns may be made.

For the purpose of explaining my invention, and more especially to simplify illustration of a pattern and article produced thereby the lace-work design shown in the accompanying drawing has been selected, in which:—

Fig. 1 is a view of a pattern-sheet for a doily or art-square.

Fig. 2 is a similar view, with a part of the lace-work applied.

Figure 5:
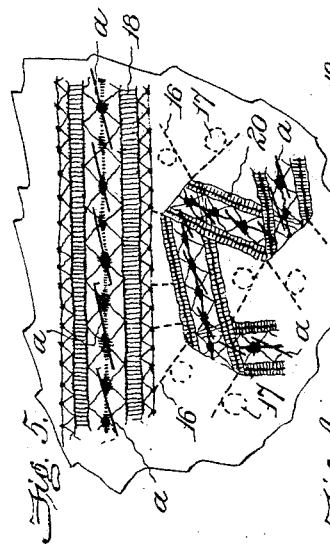
Fig. 5 is an enlarged detail view to show the basting threads attaching the bands of lace-inserting to the pattern.

In carrying out my invention I provide in the first instance a pattern-sheet 10 containing a pattern or chart 11 and a space 12 above the same to receive printed directions or instructions for making the article; said pattern-sheet forming the base or groundwork upon which certain material of the article to be produced is laid out according to the pattern and with the aid of which other work is accomplished in completing the article, and though the pattern-sheet shown in the drawings embodies a very simple design for a doily or art-square it will be understood that other designs having the same characteristics will be provided for the same article as well as for various other articles. In the sample pattern shown there are outer and inner squares 13 and 14 formed by parallel lines spaced apart according to the width of lace-inserting to be used in this instance, and between these squares are zig-zag lines in parallel relation spaced apart to receive lace-inserting of the desired width and connected by diagonal lines to indicate where and how the ribbon of lace-inserting is to be folded in continuing its course from a starting and ending point on the pattern, as at A; in other words the zig-zag lines illustrate a continuous ribbon, 15, folded at intervals to extend in zig-zag fashion and carry out the design. The pattern is also provided with dotted lines 16 connecting the ribbon-like design and squares at intervals to indicate where certain needlework is to be done in connecting the lace, and with dotted circles 17 in connection with said dotted lines to indicate other work according to the directions printed on the pattern-sheet.

Figure 4:
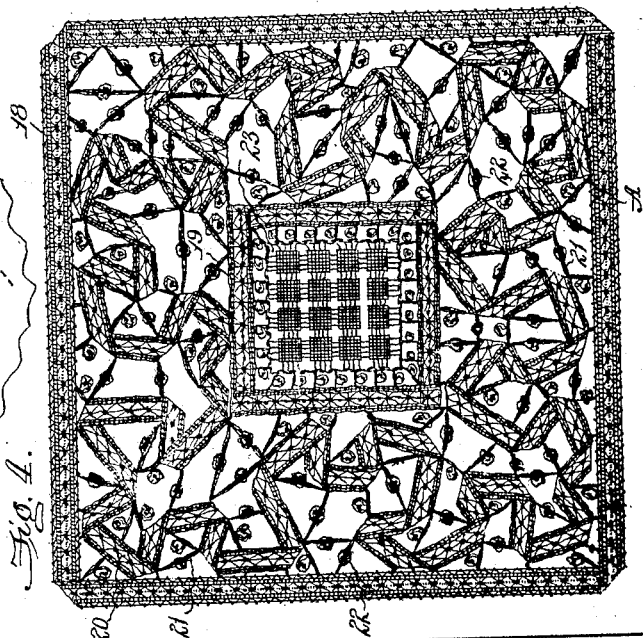
Fig. 4 is a view of the completed article produced in accordance with the pattern shown in Fig. 1.
Figure 3:
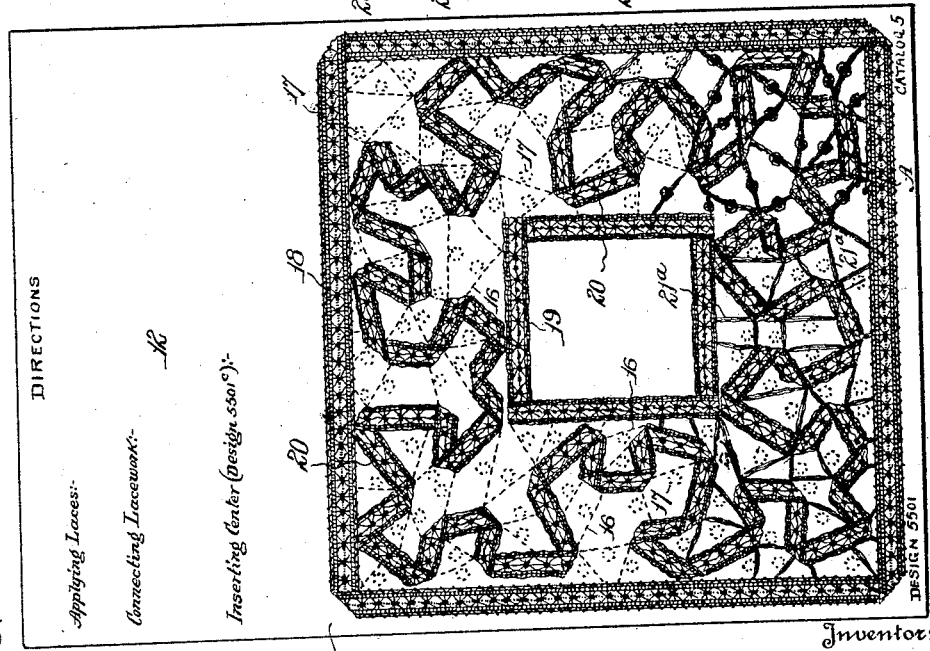
Fig. 3 shows a further step in carrying out my invention.

In making the article shown in Fig. 4 from the pattern shown in Fig. 1, lace-inserting 18 is arranged on the outer square 13 as shown in Fig. 2 and basted to the pattern-sheet by stitches $a$, as shown in Fig. 5. Lace-inserting 19 is similarly applied to the inner square 14, with a slightly different arrangement of corners; that is to say the material is folded to provide beveled corners in one instance and square corners in the other. The basting threads are applied as the lace is carried around the pattern in forming the squares, and in like manner the lace-work 20 in zig-zag design is carried around the pattern between the squares beginning at point A and returning to this point. The lacework is now connected together, first by threads 21$^a$, preferably three strands, and these threads are overwhipped or preferably three strands, and these strands are overwhipped by a thread to form a cord after the manner of buttonhole stitches 21, in each instance the cord being worked to the center 17 and after forming bow 22 of three loop stitches and connecting same to last buttonhole stitch the cord is completed and the thread secured by inserting the needle under and through said cord. The article may now be completed by filling in the inner square either with a square of plain linen or a fancy center such as illustrated in Fig. 4 of the drawings.

The directions or instructions printed on the pattern-sheet will state briefly the manner of carrying out the work in making the article shown or illustrated in a book of designs which will be issued for the selection of patterns; in other words when one selects an article and particular design of that article in the book of illustrated designs the pattern may be obtained by ordering according to the number of the book or catalog and number of the design. Of course in case of a complicated design, requiring considerable more work than is required in the doily or art-square shown in the drawings, the space 12 above the pattern may not be large enough to receive the directions or instructions, and in such instances the directions or instructions will be printed on separate sheets, or folder.

As will be noted my invention consists in providing a pattern-sheet with a pattern printed thereon lined to show exactly how the lacework is applied and basted to said pattern-sheet, as well as further instructions for connecting the lacework to follow out the particular design, and how to complete the article with a center in accordance with the general design; in other words, the invention provides an arrangement by which anyone who is handy with a needle can make articles of lace in imitation of antique or historic laces, the instructions being explicit in each instance in order that the desired effect may be produced, and although I have shown in the drawings a very simple article that may be produced in carrying out the process it will be understood that it will be considerably more helpful in carrying out elaborate designs for other lacework; for instance in providing lacework insertion for women's gowns or garments, as well as various other articles having intricate designs, and in every instance there will be a faithful reproduction of the antique or historic design illustrated in the catalog.

I am aware that patterns have been provided for embroidery work, wearing apparel, &c., but so far as I am aware the means herein shown and described for producing antique and historical laces is novel and I have found that the pattern-sheets and directions or instructions in accordance with my invention meets a much desired situation with respect to the reproduction of antique and historic laces by handwork, inasmuch as there is not only a faithful reproduction of artistic effects but also the work can be accomplished very readily.

It will be understood that in the present instance the lace is basted to the pattern sheet and that in performing the other handwork, as in connecting stitches, chain, bow, &c., the needle does not penetrate the paper and therefore the article is readily removed when completed, or part thereof disconnected from the pattern sheet as the work progresses, by pulling out the basting stitches; consequently the pattern sheet may be used a number of times in reproducing the same article as in making a set of doilies.

I claim:—

Means for use in producing by handwork the artistic effects of antique and historical laces in making lacework articles consisting of a permanent pattern-sheet to which the material is temporarily applied and having printed thereon in full lines a pattern outlining the ribbons of lace and manner of arranging and folding the same according to the particular design, and dotted lines to indicate the connecting stitches and manner of forming said connecting stitches in producing the complete article.

JOHANN H. WACHTER.